United States Patent
Iijima et al.

(10) Patent No.: US 6,428,841 B1
(45) Date of Patent: Aug. 6, 2002

(54) METHOD OF PRODUCING AN ELECTRODE FOR NON-AQUEOUS ELECTROLYTIC SECONDARY CELLS

(75) Inventors: Tadayoshi Iijima; Shigeo Kurose, both of Tokyo; Satoshi Nagura, Yamaguchi; Masami Hara, Yamaguchi; Yukinori Hato, Yamaguchi, all of (JP)

(73) Assignees: TDK Corporation; Kanebo, Ltd., both of Tokyo (JP)

( * ) Notice: Subject to any disclaimer, the term of this patent is extended or adjusted under 35 U.S.C. 154(b) by 0 days.

(21) Appl. No.: 09/701,182
(22) PCT Filed: Nov. 27, 1998
(86) PCT No.: PCT/JP98/05339

§ 371 (c)(1),
(2), (4) Date: Nov. 27, 2000

(87) PCT Pub. No.: WO99/62130

PCT Pub. Date: Dec. 2, 1999

(30) Foreign Application Priority Data

May 27, 1998 (JP) .............................. 10-145663

(51) Int. Cl.$^7$ .............................. B05D 5/12; H01M 4/60
(52) U.S. Cl. ........................... 427/77; 427/58; 429/213; 429/232
(58) Field of Search ..................... 427/58, 77; 429/213, 429/232

(56) References Cited

U.S. PATENT DOCUMENTS

| | | | | |
|---|---|---|---|---|
| 6,117,590 A | * | 9/2000 | Skotheim et al. | 429/213 |
| RE37,076 E | * | 2/2001 | Barker | 429/324 |
| 6,300,008 B1 | * | 10/2001 | Iijima et al. | 429/217 |

FOREIGN PATENT DOCUMENTS

| | | | |
|---|---|---|---|
| JP | 63-301460 A | * | 12/1988 |
| JP | 5-28986 A | * | 2/1993 |
| JP | 8-78057 A | * | 3/1996 |
| JP | 9-27314 A | * | 1/1997 |
| JP | 9-147839 A | * | 6/1997 |
| JP | 63-301465 A | * | 12/1998 |

OTHER PUBLICATIONS

U.S. application No. 09/296,404, filed Apr. 23, 1999, pending.
U.S. application No. 09/424,591, filed Nov. 24, 1999, pending.
U.S. application No. 09/424,590, filed Nov. 24, 1999, pending.
U.S. application No. 09/424,238, filed Nov. 29, 1999, pending.
U.S. application No. 09/701,182, filed Nov. 27, 2000, pending.

* cited by examiner

*Primary Examiner*—Michael Barr
(74) *Attorney, Agent, or Firm*—Oblon, Spivak, McClelland, Maier & Neustadt, P.C.

(57) ABSTRACT

A method of producing an electrode for non-aqueous electrolytic cells comprising forming on a collector an electrode active substance layer comprising an active substance composed of polymer carbon, a conductive agent composed of graphite showing a flake form, and a binder, characterized in that when the specific surface area of the active substance as measured by the BET method is denoted by Sa, the compounded weight thereof at the time of kneading by Wa, the specific surface area of the graphite as measured by the BET method by Sg, and the compounded weight thereof at the time of kneading by Wg, the mixture is kneaded by a kneading device under conditions satisfying the following equation:

$$Wa/wg \geq 2 \ 0.5 \cdot Sg/Sa,$$

thereby making it possible to obtain an electrode for non-aqueous electrolytic cells improved in charge and discharge characteristics such as discharge potential, discharge capacity and charge and discharge cycle life.

13 Claims, 1 Drawing Sheet

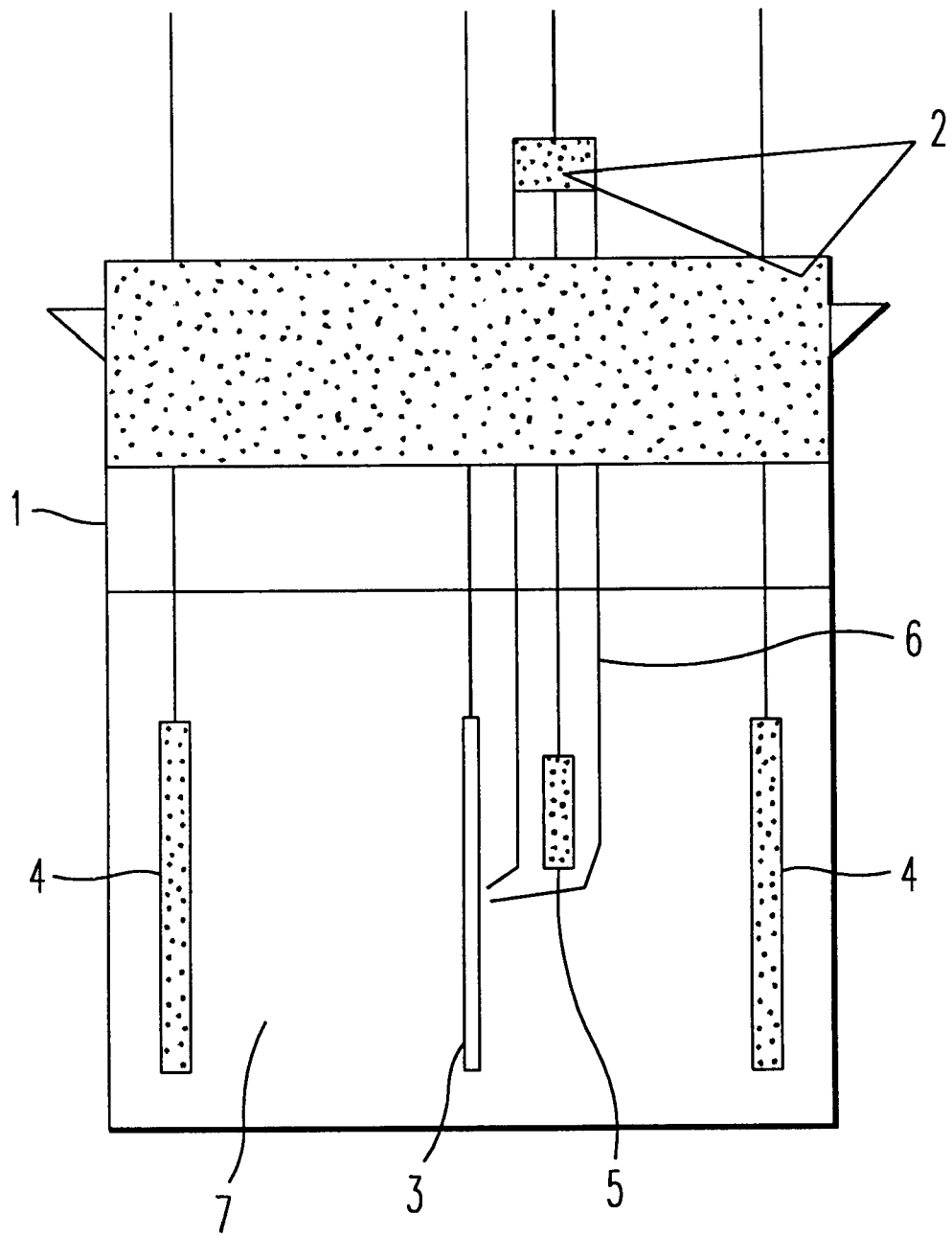

METHOD OF PRODUCING AN ELECTRODE FOR NON-AQUEOUS ELECTROLYTIC SECONDARY CELLS

TECHNICAL FIELD

The present invention relates to a method of producing an electrode for non-aqueous electrolytic cells, which is improved in charge and discharge characteristics such as discharge potential, discharge capacity, and charge and discharge cycle life.

BACKGROUND ART

As electrodes for non-aqueous electrolytic cells high in discharge potential and discharge capacity, lithium ion secondary cells occluding and releasing lithium have recently come in practice. In the production of these cells, paints for active substance layers are prepared using active substances and binders, and applied onto collectors, followed by drying. In the procedure, the composition and compounding of the materials, and production conditions such as kneading, dispersing and coating are very important. The settings thereof largely change the cell characteristics produced. Even when the composition and compounding are optimized, the characteristics are sometimes not exhibited depending on the production conditions. Accordingly, the conditions have successively been studied.

Inventions in which such production conditions have been studied are ones described in Japanese Patent Unexamined Publication Nos. 4-253157 and 7-29605. In Japanese Patent Unexamined Publication No. 4-253157, it is described that materials are efficiently mixed by using a mixer of the form that a stirring rod revolves in a kneading vessel while rotating on its axis. Further, in Japanese Patent Unexamined Publication No. 7-29605, kneading with a kneader is studied for the necessity to more enhance kneading dispersion, for increasing the weight of an electrode mixture in the specified volume, and for increasing the filling density of the mixture.

Furthermore, Japanese Patent Unexamined Publication No. 6-203833 discloses an electrode for an organic electrolytic cell in which a mixture of an insoluble, infusible substrate having a polyacene skeleton structure (PAS), a kind of polymer carbon, as an electrode active substance, a fluorine-containing polymer and polyvinylpyrrolidone is used.

However, the mixing type disperser according to the invention described in Japanese Patent Unexamined Publication No. 4-253157 or 7-29605, in which the stirring rod revolves and rotates on its axis, also has spaces other than a kneading portion. Accordingly, the materials escape into the spaces to cause great kneading loss, resulting in failure to achieve sufficient kneading. Also an open type kneader according to the invention described in Japanese Patent Unexamined Publication No. 7-29605 mentioned above is used, the materials escape similarly into the spaces, resulting in insufficient dispersion. A pressurization type kneader has the problem that the dispersibility is entirely different depending on the compounded state of the materials. In particular, when graphite showing a flake form is used as a conductive material for improving the charge and discharge cycle durability by lowering the internal resistance while increasing the filling amount of an active substance, this tendency becomes significant because the material form thereof is largely different from that of the active substance.

Further, there is a problem that it is impossible to take advantage of the characteristic, the high capacity, of polymer carbon when the composition compounding according to the invention described in Japanese Patent Unexamined Publication No. 6-203833 is only employed.

In view of the problems as described above, the invention provides a production method which can take advantage of the material characteristics when an active substance composed of polymer carbon, a conductive agent composed of graphite showing a flake form, and a binder are used.

DISCLOSURE OF THE INVENTION

In order to solve the above-mentioned problems, the present inventors have conducted intensive investigation. As a result, the inventors have discovered that the above-mentioned problems can be solved to achieve an object of the invention by a method of producing an electrode for non-aqueous electrolytic cells comprising forming on a collector an electrode active substance layer comprising an active substance composed of polymer carbon, a conductive agent composed of graphite showing a flake form, and a binder, in which the specific surface area and compounded weight of the active substance, and the specific surface area and compounded weight of graphite satisfy a specific equation, thus completing the invention.

That is to say, the invention provide (1) a method of producing an electrode for non-aqueous electrolytic cells comprising forming on a collector an electrode active substance layer comprising an active substance composed of polymer carbon, a conductive agent composed of graphite showing a flake form, and a binder, characterized in that when the specific surface area of the above-mentioned active substance as measured by the BET method is denoted by $Sa$, the compounded weight thereof at the time of kneading by $Wa$, the specific surface area of the above-mentioned graphite as measured by the BET method by $Sg$, and the compounded weight thereof at the time of kneading by $Wg$, the above-mentioned mixture is kneaded by a kneading device under conditions satisfying the following equation:

$$Wa/Wg \geq 0.5 \cdot Sg/Sa;$$

(2) the method of producing an electrode for non-aqueous electrolytic cells described in the above (1), wherein the polymer carbon has a polyacene skeleton structure, the hydrogen atom/carbon atom (H/C) is from 0.05 to 0.5, and the specific surface area as measured by the BET method is from 0.1 to 20 $m^2/g$; and (3) the method of producing an electrode for non-aqueous electrolytic cells described in the above (1), wherein the specific surface area of the graphite as measured by the BET method is from 1 to 30 $m^2/g$.

BRIEF DESCRIPTION OF THE DRAWINGS

The drawing is a cross sectional view showing a cell for measuring charge and discharge characteristics, and reference characters in the drawing show the following:

1 Beaker
2 Silicone stopper
3 Electrode (working electrode)
4 Counter electrodes
5 Reference electrode
6 Capillary
7 Electrolytic solution

BEST MODE FOR CARRYING OUT THE INVENTION

The invention will be described in detail below.

The polymer carbon, the active substance used in the invention, refers to a carbonaceous material obtained by heat treating a polymer having a crosslinked structure in an inert atmosphere (carbon obtained by carbonization of a synthetic resin), and which is obtained by carbonization of cellulose, a phenol resin, a furfural resin, polyparaphenylene or polyacrylonitrile. Of these polymer carbon materials, an active substance comprising an insoluble, infusible substrate having a polyacene skeleton structure (PAS) is a preferred material because of its high charge and discharge capacity, and which is a heat-treated product of an aromatic condensation polymer as described below, which can be produced as described below.

First, the aromatic condensation polymer, a condensation product of a phenolic hydroxyl group-containing aromatic hydrocarbon compound and an aldehyde, is produced. As the aromatic hydrocarbon compounds which are raw materials for the production thereof, for example, phenols such as phenol, cresol and xylenol, methylene bisphenols, hydroxy biphenyls, hydroxynaphthalenes, modified aromatic condensation polymers (for example, a condensation product of phenol, xylene and formaldehyde) in which the above-mentioned phenolic hydroxyl group-containing aromatic hydrocarbon compounds are partially substituted by aromatic hydrocarbon compounds having no phenolic hydroxyl groups (for example, xylene, toluene and aniline). Further, modified aromatic polymers substituted by melamine or urea, furan resins and the like can be used. Of these, the phenols are suitable, and particularly, phenol is suitable.

As the aldehydes to be allowed to react with the phenolic hydroxyl group-containing aromatic hydrocarbon compounds as described above, aldehydes such as formaldehyde, acetaldehyde and furfural, phenol-formaldehyde condensation products (novolak type, resol type or mixtures thereof) and the like can be used. Formaldehyde is preferred among others.

Then, the selected materials are allowed to react, thereby being able to obtain the aromatic condensation polymer. The aromatic polymer thus obtained is heated at a temperature of 400° C. to 800° C. in a non-oxidative atmosphere. This heat treatment brings about the dehydrogenation-dehydration reaction of the aromatic condensation polymer, and a polyacene skeleton structure is formed by the condensation reaction of aromatic rings. This reaction is a kind of heat condensation polymerization, and the reaction degree is represented by the ratio of the numbers of atoms indicated by the hydrogen atom/carbon atom (hereinafter briefly referred to as "H/C") of an end product. The H/C value of the PAS is from 0.05 to 0.5, and preferably from 0.1 to 0.35. When the H/C value of the PAS is higher than 0.5, the polyacene skeleton structure is underdeveloped, so that the electric conductivity is decreased. On the other hand, when the H/C value is less than 0.05, carbonization proceeds too much, which unfavorably deteriorates the performance as an electrode constituting material.

The polymer carbon represented by the PAS has a powder form, a short fiber form or the like, and particularly, a powder having an average particle size of 100 $\mu$m or less is desirable. The specific surface area as measured by the BET method is preferably from 0.1 to 20 $m^2/g$, and more preferably from 0.8 to 5 $m^2/g$.

It is necessary to use a conductive agent composed of the graphite showing a flake form, as the conductive agent used in the invention. Such graphite is natural graphite or artificial graphite showing the flake form. The term "flake form" used in the invention means a form of flake-like, vein-like, leaf-like, laminar or mica-like thin layers laminated with one another, and a form in which the layer structure thereof is separable by kneading as described later. Specifically, although the form of natural graphite varies depending on the producing district thereof, it may be adjusted so as to show the flake form used in the invention by after-treatments such as pulverization and classification. Artificial graphite is preferably one showing the above-mentioned flake form immediately after synthesis. However, similarly to natural graphite, it may be adjusted so as to show the flake form by after-treatments such as pulverization and classification. Of these graphite products, classified graphite is most preferred, because the flake structure becomes uniform. Such graphite products showing the flake form include LF series of Chuetsu Graphite Works Co., Ltd., UFG series of Showa Denko K. K., KS series of LONZA Co., MICROCARBO-G series of Kansai Netsukagaku Co., Ecos Carbon series of Ecos Giken Co., naturally occurring scale graphite and vein graphite, and the like.

The specific surface area of such graphite by the BET method is from 1 $m^2/g$ to 30 $m^2/g$, and the effect as the conductive agent on the active substance increases with an increase in the specific surface area. These conductive agents may be used adding them within the range of 2 to 30% by weight. In the invention, however, it is important to conduct compounding in the following manner. That is to say, the above-mentioned polymer carbon and the graphite showing the flake form are compounded according to the following establishment, and the binder is further mixed therewith, followed by kneading by a kneading device described later.

$$Wa/Wg \geq 0.5 \cdot Sg/Sa$$

wherein the specific surface area of the active substance as measured by the BET method is denoted by Sa, the compounded weight thereof at the time of kneading by Wa, the specific surface area of the graphite as measured by the BET method by Sg, and the compounded weight thereof at the time of kneading by Wg.

It becomes possible to take advantage of the high capacity characteristic of the polymer carbon and further to improve the cycle durability by keeping such compounding conditions at the time of kneading. The reason for this is considered to be that the conductive agent composed of the slightly dispersible graphite showing the flake form is pulverized with the active substance composed of the polymer carbon relatively high in hardness. In other words, the graphite particles showing the flake form in which slightly dispersible layers are overlaid with one another are considered to be dispersed so as to separate by shearing force induced by the active substance, using a large amount of the active substance just as dispersion media (beads) of a sand grinder mill in a vessel having no space.

The graphite showing the flake form is dispersed so as to separate at its crystal faces. As a result, the graphite as the conductive agent increases in surface area, which makes it possible to keep the high capacity characteristic of the polymer carbon. Further, the graphite decreases in layer thickness, thereby giving the flexibility that the graphite can follow also the changes in shape of an electrode to allow improvement in cycle durability.

Here, the equation is changed to the following equation:

$$wa \cdot Sa/Wg \cdot Sg \geq 0.5$$

is used for the left side of the above-mentioned equation. Here, wa·Sa denotes the whole surface area of the active substance before kneading, and Wg·Sg denotes the whole surface area of the conductive agent before kneading.

Further, taking the specific surface area of the conductive agent after kneading as $Sg'$ (the specific surface area of the active substance is considered to scarcely change before and after kneading), the relationship of the specific surface area after kneading is expressed by an equation, and q is introduced.

$$wa \cdot Sa/Wg \cdot Sg' = q$$

wherein q is a value approximately determined by kneading force (shearing force) given from a kneading machine to the graphite by utilizing the active substance, as long as there is no significant difference between Wa and Wg (for example, there is no difference therebetween on the order of no less than 2 figures), and does not depend on Wa/Wg. The use of a kneader as the kneading machine decreases q, whereas the use of a stirring disperser (a hyper mixer, a dissolver or a sand grinder mill) or the like increases the value of q. Even when the kneader is used, insufficient kneading causes stacking (the phenomenon that graphite particles separated before kneading come together again), leading to an increase in the value of q.

Here, the change in the surface area of the graphite before and after kneading is expressed by the following equation:

$$p \cdot Sg = q \cdot Sg'$$

Assuming that q is determined by kneading force as described above in this equation, the specific surface area $Sg'$ increases with increasing p.

The purpose of using the conductive agent herein is to reduce the internal electric resistance without impairing the capacity of the active substance (the minimum amount is added). In the above equation, increasing $Sg'$ is achieved by decreasing q, or increasing p, or satisfying both. It appears to conflict with the above-mentioned contents that the value of p is taken as 0.5 or more in the invention (that is to say, when the value of q is taken as 1 in the above equation, the specific surface area after dispersion does not change or decreases at a value of p ranging from 0.5 to 1). However, the graphite before kneading contains stacked one as a matter of course. Even if the specific surface area is large, the graphite is partially coagulated or has a bulk structure in some cases. Accordingly, a surface contactable with the active substance (a surface in the true sense) does not necessarily appear, even if a surface is recognized to a measuring gas (nitrogen gas). This has experimentally been confirmed. In such a sense, even if p is within the range of 0.5 to 1, kneading for removing stacks of the compounded graphite can be conducted.

With respect to the adjustment of such an electrode active substance layer composition, first, the ratio of the amount satisfying the above-mentioned relational equation of the active substance comprising the polymer carbon to the total amount of the conductive agent comprising the graphite showing the flake form is established as high as possible within the range kneadable with a kneading device, and both are compounded. Then, a binder solution, a binder or a solvent is added thereto, or none is added, followed by kneading by use of a kneading device. Thereafter, other materials are added so as to give a desired final compounding ratio, followed by dispersion with a stirring mixer such as a hyper mixer, a dissolver or a sand grinder mill, if necessary, to finally adjust an paint for the electrode active substance layer so as to meet the conditions of a coater. Above all, the kneading process is the most important process of the invention. In this kneading, it is necessary to compound materials in amounts corresponding to the kneading volume of the kneader used, and to sufficiently knead them. If the kneading operation is not conducted so as to form no space in the kneader, the pulverization of the graphite becomes insufficient, resulting in the difficulty of attaining the object of the invention.

The above-mentioned kneading device means an apparatus in which shear is given between a rotary blade called a kneader and a kneading tank. The form thereof may be either a batch treatment type or a continuous treatment type. Examples of the single treatment type devices include open type kneaders and pressurization type kneaders. The open type device is opened at an upper portion thereof to form a space. Accordingly, this type is unsuitable for attaining the object of the present invention. The pressurization type device can establish a space to a minimum, so that it is possible to obtain the effect of the present invention most efficiently. Further, when the continuous treatment type kneader is used, a space is slightly developed, compared with the pressurization type, because it has a feed structure. However, this type is preferred because the process can be made continuous including pretreatment such as preliminary mixing, kneading, and after-treatment such as dilution and dissolution. Specific examples of the rotary blades of such kneaders include Σ, Z, cam, roller, S, fish tail and Banbury types. Specific examples of these kneaders include single type kneaders such as MS type pressurization type kneaders of Moriyama Co. Ltd.; continuous kneaders such as KRC kneaders of Kurimoto, Ltd. and extruders of Fuji Powdernel Co., Kobe Seitetsusho Co. and Toshiba Machine Co., Ltd.; and further, small-sized kneaders such as desk-top kneaders manufactured by Irie Shokai Co., Ltd., kneaders manufactured by Takabayashi Rika Co., Ltd., and Laboplast mills and Brabender kneaders of Toyo Seiki Co., Ltd. Further, other devices having functions similar to those of these kneaders include two-roll mills and Banbury mixers.

As the binders available in the invention, thermoplastic resins or polymers having rubber elasticity can be used either alone or as a mixture thereof. Examples of the binders include fluorine polymers, polyvinyl alcohol, carboxymethyl cellulose, hydroxypropyl cellulose, regenerated cellulose, diacetyl cellulose, polyvinyl chloride, polyvinylpyrrolidone, polyethylene, polypropylene, EPDM, sulfonated EPDM, SBR, polybutadiene, polyethylene oxide and the like. Of these, fluorine-containing polymers having a fluorine atom/carbon atom atomic ratio of 0.75 to 1.5, more preferably 0.75 to 1.3, are preferred. When this value is more than 1.5, the sufficient capacity of cells can not be obtained. In the case of less than 0.75, the binders dissolve in electrolytic solutions. Such fluorine-containing polymers include polytetrafluoroethylene, polyvinylidene fluoride, vinylidene fluoride-ethylene trifluoride copolymers, ethylene-tetrafluoroethylene copolymers and propylene-tetrafluoroethylene copolymers. Further, fluorine-containing polymers in which hydrogens of the main chain are substituted by alkyl groups can also be used. Of these, polymers showing selective solubility (low in solubility in electrolytic solutions but soluble into some solvents) are preferred. For example, in the case of vinylidene fluoride polymers, they are difficult to dissolve in carbonate solvents used as electrolytic solutions, but soluble in solvents such as N,N-dimethylformamide and N-methylpyrrolidone. Although the compounding amount of such a binder varies depending on the form and grain size of the active substance and conductive agent, and the desired strength of the electrode, it is generally compounded so as to give 2% to 20% by weight, and it is particularly preferred for improving the characteristics that it is compounded so as to give 5% to 20% by weight.

As the solvents for the electrode active substance layer paints of the invention, ordinary organic solvents can be used, and specific examples thereof include organic solvents such as saturated hydrocarbons such as hexane and the like, aromatic hydrocarbons such as toluene, xylene and the like, alcohols such as methanol, ethanol, propanol, butanol and the like, ketones such as acetone, methyl ethyl ketone, methyl isobutyl ketone, diisobutyl ketone and the like, esters such as ethyl acetate, butyl acetate and the like, ethers such as tetrahydrofuran, dioxane, diethyl ether and the like, amides such as N,N-dimethylformamide, N-methylpyrrolidone, N,N-dimethylacetamide and the like, and hydrocarbon halides such as ethylene chloride, chlorobebzene and the like. Of these, the amide solvents are preferred because they can dissolve the fluorine-containing polymers. These solvents can be used either alone or as a mixture of two or more of them.

Further, the collectors for the electrode active substance compositions of the invention may be any, as long as they are electronic conductors which do not bring about chemical changes in cells constructed. For example, however, aluminum, copper, stainless steel, nickel, titanium, burned carbon and the like can be used. Further, surfaces thereof may be treated with carbon, nickel, titanium or silver. In particular, aluminum foil and copper foil are desirable, considering the resistance to oxidation, the flexibility of electrodes, the cost and the like. These collectors are coated with the paints for the electrode active substance compositions by coating methods generally well known such as reverse roll methods, direct roll methods, blade methods, knife methods, extrusion methods, curtain methods, gravure roll methods, bar coat methods, dip methods, kiss coat methods and squeeze methods. Extrusion methods are preferred among others, and the good surface state of a coated layer can be obtained by selecting the solvent composition for the paint and the drying conditions so as to be coated at a speed of 5 to 100m/minute. The thickness, length and width of the coated layer are determined by the size of a final cell. The thickness of the coated layer is preferably adjusted by press working generally employed after coating. The working pressure is preferably 0.2 to 10 t/cm, and the working temperature is preferably 10 to 150° C.

EXAMPLES

The invention will be illustrated with reference to examples in more detail below, but is not limited to these examples, as far as not exceeding the gist of the invention.

Example 1

(Synthesis of Active Substance)

A 0.5-mm thick phenol resin formed plate was placed in an electric furnace, and heat treated at a rate of 40°C./minute to 650° C. in a nitrogen atmosphere to obtain a tabular insoluble, infusible substrate having a polyacene skeleton structure (PAS). The PAS obtained herein had an H/C value by elemental analysis of 0.22. The PAS was further pulverized in a ball mill to obtain a PAS (synthesized product 1) having an average particle size of 5.4 lm and a BET specific surface area of 2.0 $m^2$/g.

TABLE 1

(Composition of Active Substance Layer Paint)

| | Name of Material | Parts by Weight |
|---|---|---|
| Active Substrate | PAS (synthesized product 1) | 80 |
| Conductive Agent | Graphite KS25 manufactured by LONZA (BET specific surface area: 11.8 $m^2$/g) | 10 |
| Binder | Polyvinylidene fluoride ELF-ATOCHEM JAPAN, KYNAR 741 | 10 |
| Solvent | N-Methylpyrrolidone (NMP) | 150 |

In 90 parts by weight of NMP, 10 parts by weight of PVDF was dissolved to prepare 100 parts by weight of a binder solution.

Eighty parts by weight of the PAS (synthesized product 1) was dry mixed with 10 parts by weight of the graphite by a hyper mixer, and the resulting mixture was placed into a pressure kneader. To this mixture, 50 parts by weight of the above-mentioned binder solution was added, and kneaded for 60 minutes while cooling a jacket of the pressure kneader, thereby carrying out the mixing and pulverization. The resulting kneaded product was taken out, and 50 parts by weight of the binder solution and 60 parts by weight of NMP were added thereto, followed by dissolution with a hyper mixer to obtain an active substance layer paint. The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Example 1.

Example 2

In 135.9 parts by weight of NMP, 15.1 parts by weight of PVDF was dissolved to prepare 151 parts by weight of a binder solution. Then, 71.4 parts by weight of the PAS (synthesized product 1) was drymixedwith23.8 parts by weight of the graphite by a hyper mixer, and the resulting mixture was placed into a pressure kneader. To this mixture, 50 parts by weight of the above-mentioned binder solution was added, and kneaded for 60 minutes while cooling a jacket of the pressure kneader. The resulting kneaded product was taken out as kneaded product A. On the other hand, 87 parts by weight of the PAS (synthesized product 1) was placed into a pressure kneader, 50 parts by weight of the above-mentioned binder solution was added thereto, and kneaded for 60 minutes while cooling a jacket of the pressure kneader. The resulting kneaded product was taken out as kneaded product B. Then, 50.3 parts by weight of the binder solution and 60 parts by weight of NMP were added to 61 parts by weight of kneaded product A and 78.7 parts by weight of kneaded product B, followed by dissolution with a hyper mixer to obtain a paint. The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Example 2.

Comparative Example 1

In 135.9 parts by weight of NMP, 15.1 parts by weight of PVDF was dissolved to prepare 151 parts by weight of a binder solution. Then, 65.8 parts by weight of the PAS (synthesized product 1) was dry mixed with 32.9 parts by weight of the graphite by a hyper mixer, and the resulting mixture was placed into a pressure kneader. To this mixture, 50 parts by weight of the above-mentioned binder solution was added, and kneaded for 60 minutes while cooling a jacket of the pressure kneader. The resulting kneaded product was taken out as kneaded product A. On the other hand, 87 parts by weight of the PAS (synthesized product 1) was placed into a pressure kneader, and 50 parts by weight of the above-mentioned binder solution was added thereto, followed by kneading for 60 minutes while cooling a jacket of the pressure kneader. The resulting kneaded product was taken out as kneaded product B. Then, 50.3 parts by weight of the binder solution and 60 parts by weight of NMP were added to 45.2 parts by weight of kneaded product A and 94.5 parts by weight of kneaded product B, followed by dissolution with a hyper mixer to obtain a paint. The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 1.

Comparative Example 2

In 135.9 parts by weight of NMP, 15.1 parts by weight of PVDF was dissolved to prepare 151 parts by weight of a binder solution. Then, 53.3 parts by weight of the PAS (synthesized product 1) was dry mixed with 53.3 parts by weight of the graphite by a hyper mixer, and the resulting mixture was placed into a pressure kneader. To this mixture, 50 parts by weight of the above-mentioned binder solution was added, and kneaded for 60 minutes while cooling a jacket of the pressure kneader. The resulting kneaded product was taken out as kneaded product A. On the other hand, 87 parts by weight of the PAS (synthesized product 1) was placed into a pressure kneader, and 50 parts by weight of the above-mentioned binder solution was added thereto, followed by kneading for 60 minutes while cooling a jacket of the pressure kneader. The resulting kneaded product was taken out as kneaded product B. Then, 50.4 parts by weight of the binder solution and 60 parts by weight of NMP were added to 29.4 parts by weight of kneaded product A and 110.2 parts by weight of kneaded product B, followed by dissolution with a hyper mixer to obtain a paint. The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 2.

Comparative Example 3

In 135.9 parts by weight of NMP, 15.1 parts by weight of PVDF was dissolved to prepare 151 parts by weight of a binder solution. Then, 139 parts by weight of the graphite was placed into a pressure kneader, and 50 parts by weight of the above-mentioned binder solution was added thereto, followed by kneading for 60 minutes while cooling a jacket of the pressure kneader. The resulting kneaded product was taken out as kneaded product A. On the other hand, 87 parts by weight of the PAS (synthesized product 1) was placed into a pressure kneader, and 50 parts by weight of the above-mentioned binder solution was added thereto, followed by kneading for 60 minutes while cooling a jacket of the pressure kneader. The resulting kneaded product was taken out as kneaded product B. Then, 50.4 parts by weight of the binder solution and 60 parts by weight of NMP were added to 13.6 parts by weight of kneaded product A and 126 parts by weight of kneaded product B, followed by dissolution with a hyper mixer to obtain a paint. The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 3.

Comparative Example 4

In 90 parts by weight of NMP, 10 parts by weight of PVDF was dissolved to prepare 100 parts by weight of a binder solution. Eighty parts by weight of the PAS (synthesized product 1) was dry mixed with 10 parts by weight of the graphite by a Henschel mixer. To this mixture, 50 parts by weight of the above-mentioned binder solution was added, and mixed for 60 minutes while cooling a jacket of the Henschel mixer. To this mixture, 50 parts by weight of the binder solution and 60 parts by weight of NMP were added, followed by dissolution to obtain an active substance layer paint. The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 4.

Comparative Example 5

In 90 parts by weight of NMP, 10 parts by weight of PVDF was dissolved to prepare 100 parts by weight of a binder solution. Eighty parts by weight of the PAS (synthesized product 1) was dry mixed with 10 parts by weight of the graphite by a hyper mixer. To this mixture, 100 parts by weight of the above-mentioned binder solution and 60 parts by weight of NMP were added, and mixed by stirring for 60 minutes to obtain an active substance layer paint. The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 5.

Comparative Example 6

The paint obtained in Comparative Example 5 was dispersed by means of a pin type sand grinder mill using zirconia beads as a dispersing medium so that the detention time in the dispersing device becomes 60 minutes, thereby obtaining a paint. The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 6.

Comparative Example 7

A paint was prepared in the same manner as with Example 1 with the exception that the graphite of Example 1 was changed to acetylene black (Denka Black manufactured by Denki Kagaku Kogyo K. K., BET specific surface area: 60.2 m²/g). The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 7.

Example 3

A paint was prepared in the same manner as with Example 1 with the exception that the graphite of Example 1 was changed to KS44 of LONZA Co. (BET specific surface area: 8.7 m²/g). The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Example 3.

Example 4

A paint was prepared in the same manner as with Example 1 with the exception that the graphite of Example 1 was changed to flake natural graphite (LF-18A manufactured by Chuetsu Graphite Works Co., Ltd., BET specific surface area: 5.2 m²/g).

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Example 4.

Comparative Example 8

A paint was prepared in the same manner as with Example 1 with the exception that the graphite of Example 1 was changed to vapor phase growth carbon fiber (VGCF manufactured by Showa Denko K. K., BET specific surface area: 12.5 m²/g).

The paint thus prepared was applied onto one side of a collector of rolled copper foil with a blade coater, and dried. Then, the same paint was applied onto the reverse side thereof, and dried, followed by compression molding with a roller press and cutting to a specified size to obtain an electrode of Comparative Example 8.

EVALUATION METHODS (Yield Value)

The viscosity of each active material layer paint was measured by the use of a cone plate type viscometer, and the yield value was determined from the relationship between the shear rate and the stress.

(Electrode Characteristics)

Each of the samples of Examples 1 to 4 and Comparative Examples 1 to 8 was cut to a size 25 mm in length and 20 mm in width, and the electrode layer was removed in a length of 5 mm at an upper end portion to leave the electrode layer of 20 mm square. A stainless steel wire was spot welded as a lead to the upper end portion from which the electrode layer was removed, thereby preparing an electrode (working electrode).

As shown in the drawing, a cell for measuring the charge and discharge capacity was prepared to conduct charge and discharge as follows:

A pair of counter electrodes 4 using lithium plates each of which is connected to a stainless steel wire and a capillary 6 having a similar reference electrode 5 were arranged in a beaker 1, and the electrode (working electrode) 3 prepared above was further arranged between the counter electrodes. As an electrolytic solution 7, a solution obtained by dissolving 1 mol/liter of lithium perchlorate as an electrolytic salt in a mixed solvent of ethylene carbonate and diethyl carbonate of a volume ratio of 1:1 was used. Each of the beaker and the capillary was sealed with a silicone stopper. Thus, the cell for measurement was prepared. Then, charge and discharge were repeated 5 times to this cell at a constant current of 2 mA within the range of 0 V to 2 V (potential vs Li/Li+). The first capacity in releasing Li ions was measured, and taken as the initial capacity. Further, the fifth capacity was also measured, and taken as the charge and discharge cycle characteristic.

TABLE 2

| | Device | Conductive Agent | Wa/Wg | 0.5 Sg/Sa | Yield Value dyn/cm² | First Capacity mAh/g | 5th Capacity mAh/g |
|---|---|---|---|---|---|---|---|
| E 1 | pressure kneader | KS25 | 8 | 2.95 | 144 | 605 | 517 |
| E 2 | pressure kneader | K525 | 3 | 2.95 | 46 | 608 | 515 |
| E 3 | pressure kneader | KS44 | 8 | 2.18 | 85 | 610 | 520 |
| E 4 | pressure kneader | LF-18A | 8 | 1.3 | 155 | 591 | 528 |
| C 1 | pressure kneader | KS25 | 2 | 2.95 | 27 | 604 | 450 |
| C 2 | pressure kneader | K525 | 1 | 2.95 | 7 | 598 | 402 |
| C 3 | pressure kneader | KS25 | 0 | 2.95 | 1 | 522 | 303 |
| C 4 | Henschel mixer | KS25 | — | — | 6 | 673 | 313 |
| C 5 | hyper mixer | KS25 | — | — | 17 | 520 | 320 |
| C 6 | SGM | KS25 | — | — | 18 | 573 | 375 |
| C 7 | pressure kneader | Denka black | 8 | 15.05 | 407 | 518 | 304 |
| C 8 | pressure kneader | VGCF | 8 | 3.13 | 134 | 515 | 368 |

E: Example
C: Comparative Example
Wa/Wg: Weight Ratio at kneading

As is known from Table 2, the results show that the active substance layer paints obtained by establishing the defined relationship between the specific surface area and the weight, and kneading by the use of the kneader are increased in yield value (the constructive property of viscosity is increased), that is to say, the specific surface area of the graphite is increased to improve dispersion. As a result, it becomes possible to bring out the improved characteristics of the polymer carbon with a smaller amount of the graphite.

Accordingly, the capacity of the electrodes prepared is increased, and the cycle characteristic that is the life of secondary cells is also improved.

INDUSTRIAL APPLICATION

The electrodes for non-aqueous electrolytic cells produced by the methods of the invention are improved in the charge and discharge characteristics such as the discharge potential, the discharge capacity and the charge and discharge cycle life, and useful for non-aqueous electrolytic cells.

What is claimed is:

1. A method of producing an electrode for a non-aqueous electrolytic cell comprising forming on a collector an electrode active substance layer, said layer comprising a mixture, said mixture comprising an active substance, a conductive agent, and a binder, wherein said active substance comprises a polymer carbon, said conductive agent comprises a graphite showing a flake form, and said mixture is kneaded by a kneading device under a condition satisfying the following equation:

$$Wa/Wg \geq 0.5 \cdot Sg/Sa$$

where a specific surface area of said active substance as measured by the BET method is denoted by Sa, a compounded weight thereof at the time of kneading is denoted by Wa, a specific surface area of said graphite as measured by the BET method is denoted by Sg, and a compounded weight thereof at the time of kneading is denoted by Wg.

2. The method as claimed in claim 1, wherein the polymer carbon has a polyacene skeleton structure.

3. The method as claimed in claim 1, wherein a hydrogen atom to carbon atom ratio is from 0.05 to 0.5.

4. The method as claimed in claim 1, wherein the specific surface area of the active substance is from 0.1 to 20 $m^2/g$ as measured by the BET method.

5. The method as claimed in claim 1, wherein the specific surface area of the graphite is from 1 to 30 $m^2/g$ as measured by the BET method.

6. The method as claimed in claim 1, wherein the polymer carbon is obtained by heat treating a polymer having a crosslinked structure in an inert atmosphere.

7. The method as claimed in claim 6, wherein the polymer having a crosslinked structure is selected from the group consisting of cellulose, a phenol resin, a furfural resin, polyparaphenylene and polyacrylonitrile.

8. The method as claimed in claim 7, wherein the phenol resin comprises phenol and formaldehyde.

9. The method as claimed in claim 6, wherein the polymer is treated at a temperature of from 400° C. to 800° C.

10. The method as claimed in claim 1, wherein the kneading device is an open type kneader or a pressurization type kneader.

11. The method as claimed in claim 1, wherein the binder is selected from the group consisting of thermoplastic resins, polymers having rubber elasticity and mixtures thereof.

12. The method as claimed in claim 1, wherein the binder is selected from the group consisting of fluorine polymers, polyvinyl alcohol, carboxyethyl cellulose, hydroxypropyl cellulose, regenerated cellulose, diacetyl cellulose, polyvinyl chloride, polyvinyl pyrrolidone, polyethylene, polypropylene, EPDM, sulphonated EPDM, SBR, polybutadiene and polyethylene oxide.

13. The method as claimed in claim 1, wherein the binder is a fluorine containing polymer having a fluorine atom to carbon atom atomic ratio of from 0.75 to 1.3.

* * * * *